(12) United States Patent
Muhlhoff (10) Patent No.: US 7,059,373 B2
(45) Date of Patent: Jun. 13, 2006

(54) TIRE WITH ADDITIONAL RING AND BEAD HAVING A SEAT INCLINED TOWARDS THE OUTSIDE

(75) Inventor: Olivier Muhlhoff, Clermont-Ferrand (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/621,175

(22) Filed: Jul. 16, 2003

(65) Prior Publication Data

US 2004/0065397 A1    Apr. 8, 2004

Related U.S. Application Data

(63) Continuation of application No. PCT/EP01/15164, filed on Dec. 20, 2001.

(30) Foreign Application Priority Data

Jan. 17, 2001   (FR) .................................. 01 00630

(51) Int. Cl.
*B60C 3/06*       (2006.01)

(52) U.S. Cl. ...................... 152/555; 152/455; 152/539; 152/543

(58) Field of Classification Search ............... 152/539, 152/546, 552, 553, 540, 541, 542, 554, 555, 152/556, 557, 558, 559, 158, 454, 544, 455, 152/543, 550, 551; 156/110.1, 123, 133, 156/155; 264/501, 502, 326, 328
See application file for complete search history.

(56) References Cited

U.S. PATENT DOCUMENTS 2,186,178 A  *  1/1940  Shoemaker ................. 152/545

3,253,636 A  *  5/1966  Travers ....................... 152/543

(Continued)

FOREIGN PATENT DOCUMENTS

DE          26 04 431          8/1977

OTHER PUBLICATIONS

International Search Report—PCT/EP01/15164.
International Preliminary Examination Report—PCT/EP01/15164.

*Primary Examiner*—Frantz F. Jules
(74) *Attorney, Agent, or Firm*—E. Mortin Remick; Frank J. Campigotto; Adam Arnold (57) ABSTRACT

The invention concerns a tire comprising at least a first and a second bead radially extending to at least a first and a second sidewall, respectively, and the sidewalls being joined to a tread; said first bead having a seat the generatrix of which has its axially inner end on a circle of diameter greater than the diameter of the circle on which is located the axially outer end. The tire further comprises a carcass reinforcement formed of at least one carcass ply and anchored in the first bead to at least one annular bead anchoring element. When the tire is mounted on its operating rim and inflated to its recommended pressure, the meridian profile of the carcass reinforcement has a tangent to the point of tangency of the meridian profile with the anchoring element of the first bead that forms, relative to the axis of rotation, an angle open towards the outside and at most equal to 70°. The sidewall further comprises an inextensible additional sidewall ring located axially to the inside of at least an axially outermost carcass reinforcement ply and a profiled rubber mix element located radially between the annular anchoring element of the bead and the additional ring of the sidewall and axially located to the inside of the axially outermost ply.

20 Claims, 4 Drawing Sheets

U.S. PATENT DOCUMENTS

| | | | |
|---|---|---|---|
| 3,631,913 A * | 1/1972 | Boileau | 152/454 |
| 3,994,329 A * | 11/1976 | Masson et al. | 152/517 |
| 4,124,679 A * | 11/1978 | DeWitt | 264/233 |
| 4,177,852 A * | 12/1979 | Merli et al. | 152/550 |
| 4,307,767 A | 12/1981 | Calori | |
| 4,345,634 A * | 8/1982 | Giron | 152/454 |
| 4,700,765 A * | 10/1987 | Masclaux | 152/545 |
| 5,285,835 A * | 2/1994 | Ueyoko et al. | 152/209.14 |
| 5,479,977 A * | 1/1996 | Tamano et al. | 152/542 |
| 5,509,455 A * | 4/1996 | Warchol et al. | 152/545 |
| 5,836,366 A | 11/1998 | Muhlhoff | |
| 5,971,047 A * | 10/1999 | Drieux et al. | 152/158 |
| 6,491,077 B1 * | 12/2002 | Lopez et al. | 152/454 |
| 6,554,038 B1 * | 4/2003 | Chandezon et al. | 152/539 |
| 6,598,644 B1 * | 7/2003 | Eynard | 152/547 |
| 6,688,354 B1 | 2/2004 | Drieux et al. | |
| 2002/0046795 A1 * | 4/2002 | Billieres | 152/539 |
| 2003/0136488 A1 * | 7/2003 | Muhlhoff | 152/455 |

* cited by examiner

TIRE WITH ADDITIONAL RING AND BEAD HAVING A SEAT INCLINED TOWARDS THE OUTSIDE

CROSS-REFERENCE TO RELATED APPLICATIONS

This application is a continuation of International Application No. PCT/EP01/15164, filed Dec. 20, 2001 and published Jul. 25, 2002 in French as International Publication No. WO 02/057096 A1, and further claims priority to French Application No. 01/00630, filed Jan. 17 2001.

BACKGROUND OF THE INVENTION

The present invention relates to a tire, and more particularly to the sidewalls and beads of such a tire. French Patents FR 2 699 121 and FR 2 716 645 describe a tire having a radial carcass reinforcement of low H/S ratio, H being the height of the tire on its rim and S the maximum axial width thereof, which is intended to be mounted on a rim, at least one seat of which is inclined towards the outside and extended axially to the outside by a protrusion of low height. Said tire comprises at least one bead having the following characteristics:
  a) the meridian profile of the center section of the carcass reinforcement is tangent to the anchoring bead wire of the carcass reinforcement at a point T such that the tangent TT' forms with a line parallel to the axis of rotation of the tire an angle $\phi$, which is open radially and axially towards the outside, of at least 70°,
  b) the bead is intended to be mounted on a rim such as described in the above patents, that is to say, one having the special characteristic of having at least one rim seat inclined towards the outside, said seat being extended axially to the inside either by a rim flange or by the rim base on which is laid a tread bearing support, a lateral face of said support being used as the rim flange, and said seat being extended axially to the outside by a protrusion or hump of low height;
  c) the external contour of the bead has a profile adapted to the profile of the mounting rim above, and said bead has the special feature of having a heel arranged axially to the inside, whereas the bead toe is arranged axially to the outside.

When the axially outer wall of said bead is set back axially relative to the axially outermost end of the rim, the type of tire described does not protect the axially outermost metallic elements of the rim against curbing aggression when traveling in towns. This problem may be solved by adapting the axially outer form of the toe of the bead, this adaptation resulting in covering the edge of the outer protrusion of the rim with a greater or lesser mass or protuberance of rubber of a suitable quality, the maximum axial width of the outer contour of the toe of the bead being greater than the space taken up or maximum axial width of the mounting rim.

Patent FR 2 779 386 teaches providing the axially outer protuberance of said bead with incisions of a width other than zero, of a depth at most equal to 5 mm and arranged circumferentially parallel to each other, which makes it possible to minimize the consequences of curb scrub on said axially outer protuberance of the bead, which is very sensitive on one hand to abrasion when the tire rubs against the curb, and on the other hand to rubber fragments being torn off following the initiation and propagation of cuts and/or tears.

In addition to the reduction in scrubbing between the outer wall of a protuberance owing to the presence of numerous thin rubber elements, it would appear that the propagation of the degradation of the rubber mass is minimized by this presence, which very clearly reduces the visual perception of the damage caused.

To minimize the phenomena of unwinding of the carcass reinforcement from around the annular reinforcement element of the bead heel, application FR 2 788 239, advocates a modification of the angle $\phi$ formed by the tangent TT', to the point of tangency T of the meridian profile of the carcass reinforcement with the annular element of the bead, relative to the axis of rotation, said angle $\phi$ being between 45° and 70°. In the portion located in the bead zone, the greater inclination of the meridian profile of the carcass reinforcement also permits lesser degradation of the axially outer walls of the beads, in particular the beads placed to the outside of the vehicle fitted with such tires. However, this also involves many drawbacks in particular, a great reduction in the radial, transverse, and longitudinal rigidities, which is not without effects on the behavior of the vehicle.

To obtain a tire, destined to be mounted on a rim having at least one seat inclined towards the outside, having non-degraded rigidities while enabling the beads of the tire and the rim not to be damaged by the shocks and/or friction of all types, the invention proposes combining the meridian profile of the carcass reinforcement of tangent 45°–70° with a specific sidewall structure referred to as having an additional ring.

SUMMARY OF THE INVENTION

The tire, according to the invention, comprises at least two beads joined to a tread by means of two sidewalls, at least the first bead having a seat the generatrix of which has its axially inner end on a circle of diameter greater than the diameter of the circle on which is located its axially outer end, and a carcass reinforcement formed of at least one ply and anchored in said first bead B to at least one annular bead anchoring element, and when the tire is mounted on its operating rim and inflated to its recommended pressure, the meridian profile of said carcass reinforcement has a tangent TT' at the point of tangency T of said profile with the anchoring element of said first bead that forms relative to the axis of rotation an angle $\phi_2$ open towards the outside at most equal to 70°. Furthermore, the sidewall of this tire radially extending said first bead comprises:
  an inextensible additional sidewall ring located axially to the inside of at least one axially outermost carcass reinforcement ply and,
  a profiled rubber mix element located axially to the inside of the axially outermost ply and extending radially between the annular bead anchoring element and the additional sidewall ring.

The axially outermost carcass ply may be radial, that is to say, a ply comprising reinforcement elements which are parallel to each other in the ply and form with the circumferential direction an angle between 80° and 90°. It may also be formed of elements inclined relative to the circumferential direction, forming an angle between 60° and 80°.

The term "annular bead anchoring element" is to be understood to mean any reinforcement element which makes it possible to take up the tensile forces of the carcass reinforcement under the effect of the inflation pressure. This anchoring element, as is known per se, may be a bead wire formed of circumferential cords or cables, or more generally a stack of several strips of cords or cables forming a zero angle or an angle at most equal to 10° with the circumferential direction. The anchoring is accomplished by adhesion to the annular element over a sufficient length that is effected by a full or partial winding around the annular element. Alternatively, the anchoring is effected by inserting the carcass reinforcement between strips or windings of circumferential or quasi-circumferential cords or cables.

The additional sidewall ring is said to be inextensible, which must be understood as being a ring which, when subjected to a circumferential tensile force equal to 10% of its breaking load, has a relative elongation at most equal to 1%. Said ring may be of several forms:
 the form of a monofilament of greater or lesser dimensions of cross-section;
 the form of a cabled assembly, be it a bead wire or a cable proper; or
 the form of layers of bands of circumferential cords or cables, these layers possibly being parallel to the equatorial plane or parallel to a radial plane.

Equivalently, the additional ring may be made from a single material having appropriate extension rigidity, in all cases, greater than the average rigidity of the rubber mixes. This additional ring may be made of materials such as plastics, polyurethane, aromatic polyamide, fiber reinforced resin by (carbon, glass, etc.), or metal. This additional ring may also be comprised of two or more materials. The additional ring may be hollow to limit the increase in weight resulting from its presence in each sidewall.

In the combination claimed, the additional sidewall ring is preferably located radially outward from the base of the first bead a distance at most equal to two-thirds of the height H of the tire on the rim. It is then possible to retain all the anti-unseating properties of said first bead. The transverse rigidity of the tire is in part a function of the inclination of the straight line joining the two centers of gravity of the meridian sections of the annular anchoring element and of the sidewall ring: said straight-line segment advantageously forms an angle of $\phi_1$ open towards the outside of at most 70° with the axial direction.

An essential factor in the operation of each sidewall, comprising an additional ring and a profiled rubber element, lies in the mechanical coupling created between the additional sidewall ring and the bead by means of the profiled rubber element extending radially inwards from said ring. The profiled rubber element comprises at least one compound having a Shore A hardness at least equal to 65 points to provide good resistance to the compressive stresses. Thus, the rigidity of the sidewall is increased by opposing displacements of the additional ring towards the inside of the tire.

The profiled rubber element may further comprise a second mix of a Shore A hardness of less than 65 points. In this case, the mixture of higher Shore A hardness is radially closest to the additional sidewall ring, whereas the mixture of lower Shore A hardness is radially closest to the annular anchoring element, which facilitates the mounting of the tire on its operating rim.

Also equivalently, the additional sidewall ring and the profiled element may be integrated in a single element which is prefabricated independently of the manufacture of the tire itself, and may then be incorporated in the tire at the time of its manufacture. This single element may be made of a single material or alternatively of a composite material (that is to say, a material comprising a matrix reinforced by reinforcements with the aim of imparting appropriate rigidities to said element). When the single element replaces an additional ring and a profiled element of rubber mix, its cross-section is appropriate to obtain the desired rigidity and hence the desired mechanical effect in the tire. Of course, to obtain a good adhesion between the single element and the rubber mixes of the tire, treatment of the surface of said element that improves adhesion may be provided. Furthermore, orifices may be formed through said element to allow the rubber mixes of the tire to flow during molding and vulcanization.

The anti-unseating properties of the beads of the tire are improved by an anchoring formed by winding about a bead wire of quasi-circular section to form an upturn extending in a profiled rubber mix element of high Shore A hardness. This profiled element has the form of a wedge of cross-section corresponding to a circular sector, for example, as described in French Patent 2 716 645. The upturn of the carcass ply may be substantially rectilinear and have a length substantially equal to the length of the sides of the wedge-shaped profiled rubber element. It may be located to the inside of said profiled element, and may form either the radially inner side, or the radially outer side of said profiled element, it being understood that that it must be accepted by convention that the upturn in the latter cases is considered as extending into the profiled element.

Preferably, the upturn of the carcass reinforcement ply has a length sufficient for contact with the total perimeter of the profiled element or wedge. It thus forms the radially outer and inner sides of the profiled rubber element and the side opposite the apex or center of said profiled element. The end thereof is located axially beyond the point of intersection of the two outer and inner sides. That part of the upturn immediately adjacent to that part of said upturn which is wound about the bead wire forms first the radially outer side of the profiled element or wedge, then the side opposite the apex of said profiled element, and finally the radially inner side. The upturn ends beyond the junction point of the two outer and inner sides. It may also first form the radially inner side of the profiled element, then the side opposite the apex of said profiled element, then finally the radially outer side, ending in the same manner as previously.

The carcass reinforcement is advantageously composed of at least two carcass plies, which may be formed of reinforcement elements which are radial or crossed from one ply to the next, the second carcass ply or axially inner ply being located axially to the inside of the additional sidewall ring and to the inside of the profiled element radially located between the anchoring element and said additional ring. Depending on whether the first axially outer carcass ply is or is not anchored to the bead anchoring element with an upturn, said second ply may or may not be anchored to said anchoring element.

Better protection of the sidewalls and beads is ensured if a profiled rubber element in the form of a crescent is arranged axially to the inside of the axially innermost carcass ply, this profiled element having a maximum thickness substantially at the level of the line of greatest axial width of the tire and a minimum thickness at the level, respectively, of the edges of the crown reinforcement and of the carcass anchoring element.

If the first bead is defined as the bead of the tire which is axially to the outside of the vehicle, then the second bead, axially to the inside of the vehicle, does not require the same protection from the external aggression and does not demand the same properties of anti-unseating. It is advisable to create a dissymmetry between the sidewalls and beads on both sides of the equatorial plane according to the properties desired, even when the beads and sidewalls may be geometrically perfectly symmetrical relative to the equatorial plane, and of the same construction. The dissymmetry may also be realized by adopting a conventional profile or external contour for the second bead. That is to say, a bead contour with a rectilinear axially outer wall, substantially perpendicular to the axis of rotation and intended to be in contact with the rim flange axially to the outside of said rim, and axially to the inside in the extension of said wall a bead seat inclined towards the inside and intended to come into contact with the rim seat.

The meridian profile of at least the ply forming part of the carcass reinforcement axially to the outside of the additional sidewall ring may be identical in the two beads and sidewalls or different independent of whether the second bead has a seat inclined towards the outside or the second bead has a seat inclined towards the inside. It is advantageous to optimize the rigidities of the bead and sidewall to employ a meridian profile of said carcass ply where a tangent between the meridian profile of the carcass ply and the anchoring element of the second bead forms an angle, open towards the outside, which is at least equal to 20° and greater than the angle formed by the tangent to the meridian profile of the ply anchored to the anchoring element in the first bead and sidewall.

The dissymmetry may be realized by adopting a second bead and sidewall without an additional sidewall ring. This allows the possibility of having a second bead and sidewall where a tangent between the meridian profile of the carcass ply and the anchoring element of the second bead forms an angle, open towards the outside, which is greater than 70° and at most equal to 90°.

It is advantageous for the two bead seats to have different diameters independent of whether the second bead seat is inclined towards the outside or inclined towards the inside, whether the meridian profile of a carcass ply is taut (low curvature profile) or non-taut (high curvature profile), or whether or not the second sidewall has an additional ring. To facilitate the mounting of the tire and to optimize the internal volume of the rim, the second bead preferably has the larger diameter and is located to the inside of the vehicle fitted with the tires in question.

BRIEF DESCRIPTION OF THE DRAWINGS

The characteristics and advantages of the invention will be better understood with reference to the following description, which refers to the appended drawings, which illustrate examples of embodiment in non-limitative manner and in which.

DETAILED DESCRIPTION OF THE PREFERRED EMBODIMENT

Figure 1:
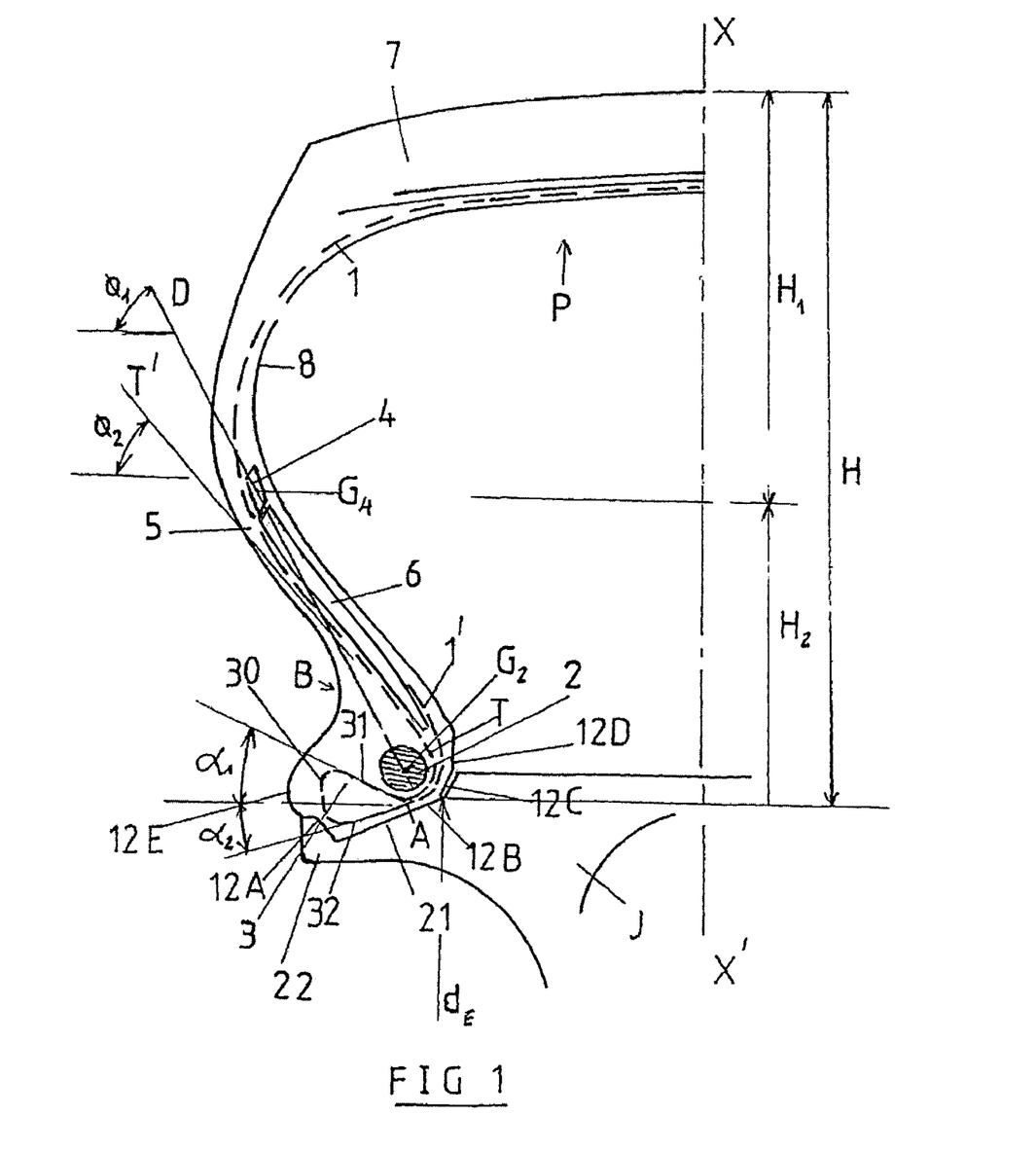
FIG. 1 is a diagram of a simplified variant of the assembly according to the invention.

The tire P, shown in meridian section in FIG. 1, is symmetrical relative to the equatorial plane XX'. It comprises a tread 7 connected to two beads B by two sidewalls. The carcass reinforcement 1 is comprised of a single radial ply 1 of textile radial reinforcement elements and is anchored within each bead B by winding around an anchoring element 2, a bead wire of "braided" type, to form an upturn 1'. The upturn 1', after a first pass beneath the bead wire and axially from the inside to the outside, surrounds a profiled element or wedge 3 of rubber mix of high Shore A hardness, greater than 65 points. The profiled element 3 has a cross-section in the form of a sector of a circle with two sides 31 and 32 originating from an apex A located beneath the cross-section of the bead wire 2. The radially outer side 31 forms an acute angle $\alpha_1$ relative to a line parallel to the axis of rotation of between 20° and 70° and open radially towards the outside. The radially inner side 32 forms an acute angle $\alpha_2$ relative to said parallel line of between 0° and 30° and open radially towards the inside. A third side 30 opposite the apex A completes the section of the wedge 3. After passing beneath the bead wire, the upturn 1' forms the radially upper side 31, then the side 30 opposite the apex A, then the radially lower side 32. The upturn 1' then passes beneath the bead wire 2 again and rises again radially into the bead B to have an end radially farther from the axis of rotation than the center of gravity of the meridian section of the bead wire 2.

With the tire mounted on its operating rim J and inflated to its operating pressure, the meridian profile of the single carcass ply 1 has a constant direction of curvature over its entire length. The tangent line TT' extends from the point of tangency T of said profile with the bead wire 2 of the beads B and forms relative to the axis of rotation an angle $\phi_2$ open axially and radially towards the outside and equal to 50°. The inclination of said tangent permits better clamping on rim of the beads thus formed, better resistance to unseating, and good resistance to unwinding of the carcass reinforcement. It also makes possible the use of a narrow rim for the type of bead in question, hence better protection of the axially outer parts of the bead and rim while not adversely affecting the rigidities of the sidewalls and beads of the tire.

The bead B of the instant tire has a heel axially to the inside and a toe axially to the outside. In a view axially from the inside to the outside, the profile or external contour is composed of a wall 12D substantially perpendicular to the axis of rotation that may possibly bear laterally on the axially outer face of a support ring for a tire tread. The wall 12D of the bead B extends axially to the outside by a frustoconical generatrix 12C, forming with a line parallel to the axis of rotation an angle of 45° open axially towards the inside and radially towards the outside. The generatrix 12C also extends axially to the outside by a second frustoconical generatrix 12B of the bead seat forming with the direction of the axis of rotation an angle of 15° open axially towards the inside and radially towards the outside. The generatrix 12B is said to be inclined towards the outside, its axially outer end being on a circle of diameter less than the diameter of the circle on which its axially inner end is located. A frustoconical generatrix 12A extends the generatrix 12B axially to the outside and forms with the direction of the axis of rotation an angle of 45° which is open axially and radially towards the outside. A wall 12E, which is curved in the example described, joins with the frustoconical geneatrix 12A to complete the contour of the bead B. Whereas the generatrix 12B will bear on the rim seat 21, which is inclined towards the outside, the generatrix 12A will bear on the axially inner wall of the protrusion or hump 22 of the rim J, which is inclined by an angle equal to the angle formed by the generatrix 12A. When viewed in meridian section, the portion of the bead adjacent to the wall 12D and to the generatrix 12C forms the heel of the bead B. The portion of the bead adjacent to the generatrix 12B, to the generatrix 12A and partially to the wall 12E constitutes the toe of the bead B.

An additional inextensible reinforcement ring 4 is arranged in the sidewall 5 of the tire, and the center of gravity $G_4$ of its meridian section is radially located at a distance $H_2$ from the base of the bead. $H_2$ is equal to 31% of the height H of the tire, measured relative to the bead base which is also the rim base and with the tire mounted on its rim and inflated to the recommended pressure. The base of a bead is defined in a meridian section view and corresponds to the straight line parallel to the axis of rotation of the tire and passing through that point of the generatrix of the bead seat radially farthest from said axis of rotation.

The additional ring 4 divides the sidewall reinforced by the carcass reinforcement 1 into two distinct portions, one axially and the other radially. The axially outer portion is reinforced by the carcass ply 1, whereas the axially inner portion corresponds to that part of the sidewall reinforced in the radially lower part by a single profiled element 6 of rubber mix of high Shore A hardness equal to 70 points. The Shore A hardness is measured in accordance with Standard ASTM D2240. This profiled element 6 extends between the additional ring 4 and the point of tangency T of the carcass ply 1 with the anchoring bead wire 2 of the carcass ply so as to be able to be stressed in compression when the additional ring 4 is displaced axially towards the inside of the tire and to effect a greater or lesser degree of mechanical coupling between the additional ring and the anchoring bead wire.

The radially upper portion of the sidewall of radial height $H_1$ corresponds to the part where the carcass ply 1 is practically covered axially to the inside with the sole internal layer of rubber 8. This portion—referred to as "pneumatic sidewall portion" is due to the low stiffness compared with the stiffness of the radially lower part of the sidewall, whereas the second radially lower portion, of height $H_2$, comprising the profiled element 6 is referred to as "structural sidewall portion."

In the instant example, the thickness of the profiled element 6 is substantially constant over its entire height and is equal to 7 mm on average. The second radially lower sidewall portion is greatly inclined relative to the axial direction. It is supposed that the inclination of said part is represented by the direction of the straight line D joining the centers of gravity of the meridian sections $G_2$ of the anchoring bead wire 2 and $G_4$ of the additional ring 4 respectively. This straight line D forms with the axial direction an angle $\phi_1$ open axially and radially towards the outside at most equal to 70°, and in the case described equal to 59°.

Figure 2:
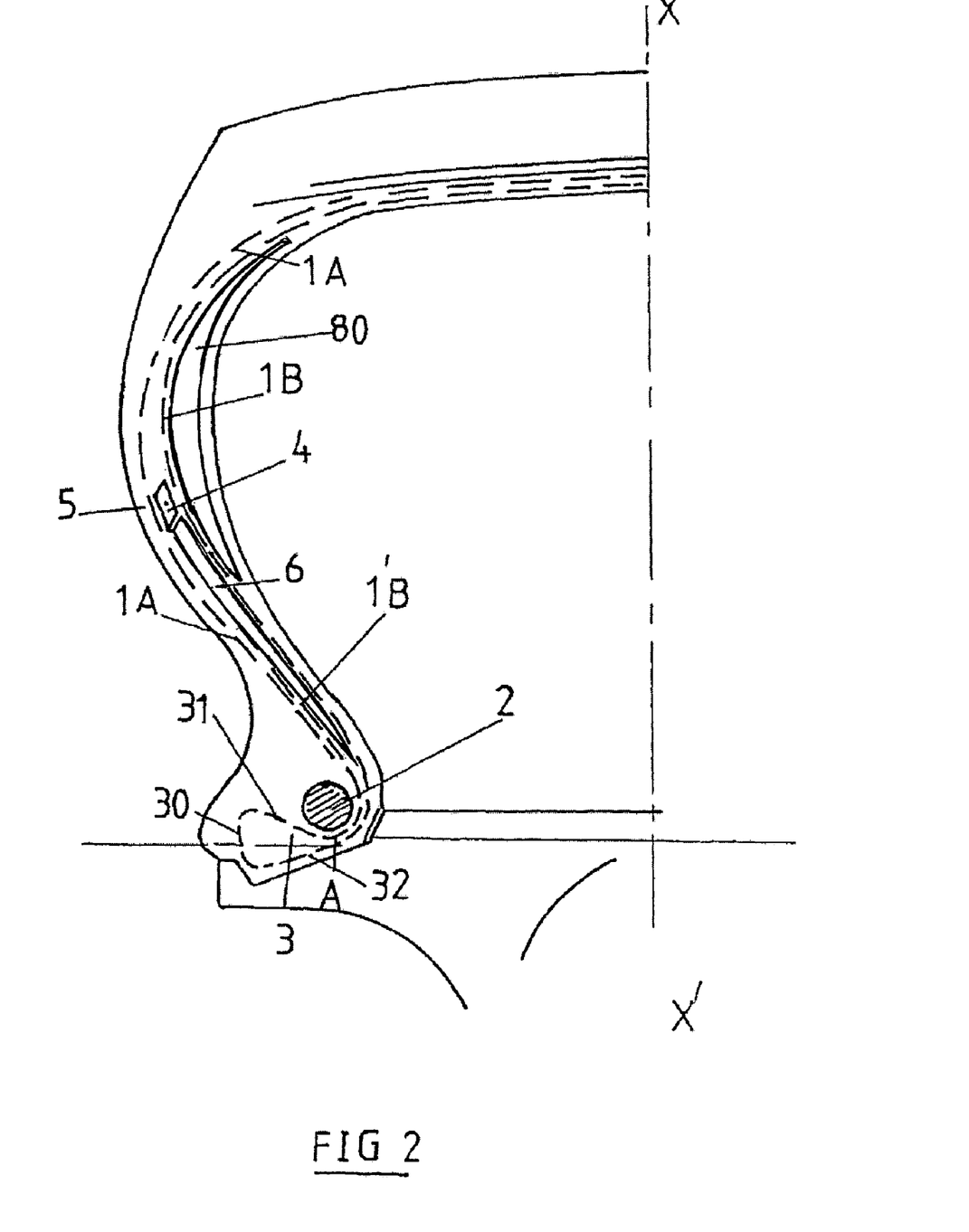
FIG. 2 shows a second variant in the same manner.

The tire shown in FIG. 2 differs from that of FIG. 1 by the following three main characteristics:
  (a) the carcass reinforcement is formed of at least two carcass plies 1A and 1B, at least one radial ply 1A which is the ply axially to the outside of the additional sidewall ring 4, and at least one radial ply 1B located axially to the inside of said ring;
  (b) the ply anchored by winding in the bead B around the bead wire 2 is the axially inner ply 1B, and the upturn l'B thus formed. As in the previous example, the ply surrounds a profiled element or wedge 3 of rubber mix of high Shore A hardness; the upturn 1'B forms, after passing beneath the bead wire 2, the radially lower side 32 then the side 30 opposite the apex A, then the radially upper side 31, then passing beneath the bead wire 2 again and rising again radially into the bead B, to have one end radially farther from the axis of rotation than the center of gravity of the meridian section of the bead wire 2; this end is sufficiently far from said axis for the length of connection between the upturn 1'B and the edge of the axially outer ply 1A, which is not wound around the bead wire 2, to be sufficient to withstand the existing tensile forces; the carcass plies 1A and 1B tightly surround, in the radially lower portion of the sidewall 5 of the tire. The profiled element 6 of rubber mix of high Shore A hardness;
  (c) the sidewall 5 is reinforced axially to the inside by a profiled rubber element 80 in the form of a crescent with a maximum thickness substantially above the line of greatest axial width of the tire, said thickness possibly being between 5 and 15 mm, depending on the dimensions and types of tire studied.

Figure 3:
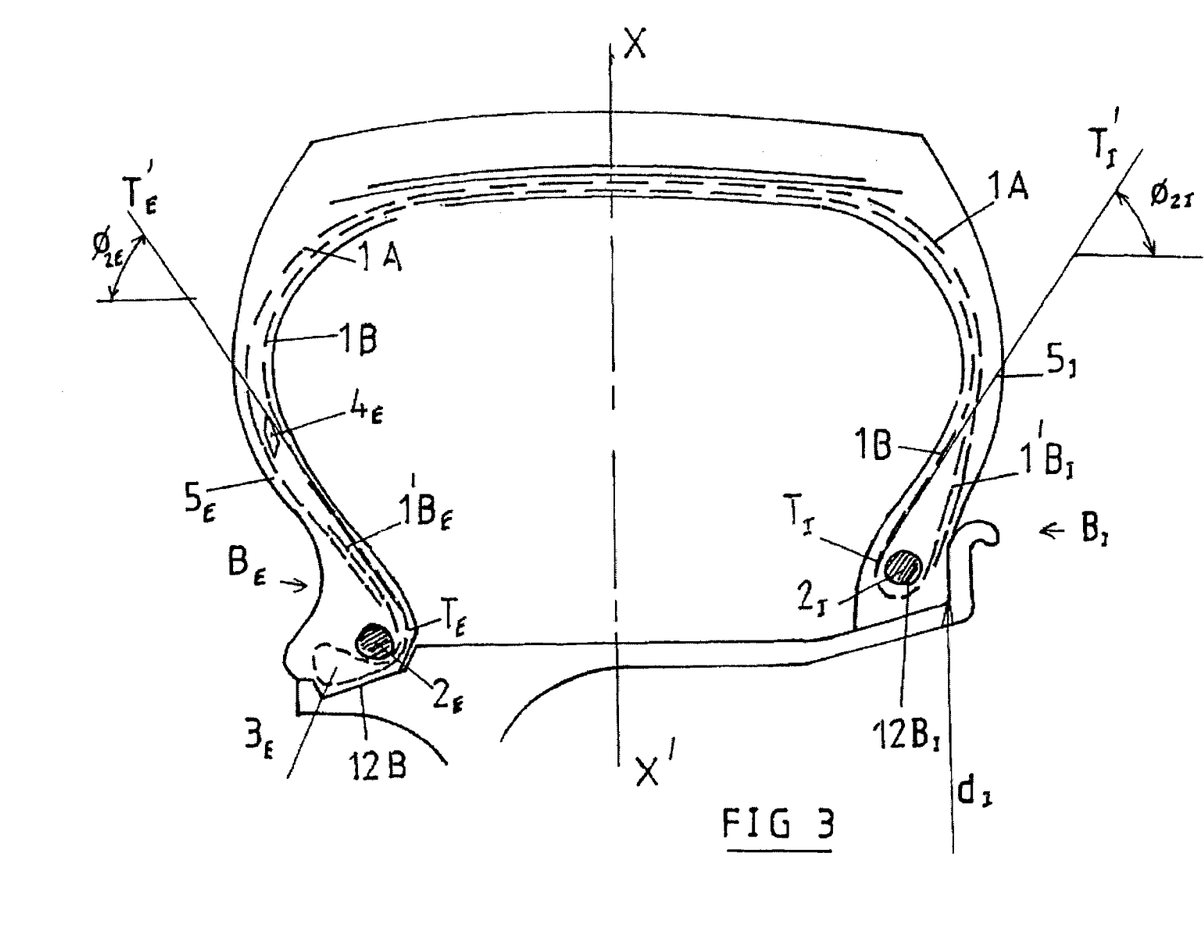
FIG. 3 shows an asymmetrical tire variant.

The above two examples relate to tires having a plane of symmetry corresponding to the equatorial plane XX'. The following two examples relate, on the other hand, to what are called asymmetrical tires. The tire which is shown in FIG. 3 has a dissymmetry which may be characterized mainly by the presence:
  (a) on one side of the equatorial plane, of a first sidewall and bead such as described previously, that is to say:
    a-1) with a first bead $B_E$ having a seat 12$B_E$ inclined towards the outside and comprising a wedge 3$_E$ of rubber of high Shore A hardness, around which is wound the upturn 1'B$_E$ of a carcass ply 1B, the meridian profile of which ply has at the point of tangency $T_E$ with the anchoring annular element 2$_E$ a tangent $T_E T'_E$ forming relative to the axis of rotation an angle $\phi_{2E}$ at most equal to 70°,
    a-2) with a first sidewall 5$_E$ comprising an additional sidewall ring 4$_E$, axially to the outside of which there is at least one carcass ply 1A,
  (b) on the other side of said equatorial plane, a second conventional sidewall 5$_I$ and bead $B_I$, that is to say:
    b-1) with a second bead $B_I$ having a seat 12$B_I$ inclined towards the inside reinforced by an anchoring element 2$_I$ around which is wound at least one carcass ply 1B, said element 2$_I$ being surmounted radially by a substantially triangular rubber profiled element,
    b-2) with a second sidewall 5$_I$ reinforced by at least one carcass ply 1B without the presence of an additional sidewall ring 4.

The first bead $B_E$ of the tire of FIG. 3, which is intended to be mounted on a rim, the first rim seat of which is inclined towards the outside, is identical to the one shown in FIG. 2. The sidewall 5$_E$, as in the preceding examples, is reinforced by an additional sidewall ring 4$_E$ The second bead $B_I$, which is intended to be mounted on a rim with a rim flange perpendicular to the axis of rotation and a rim seat which is inclined towards the inside or possibly flat, is simply reinforced by an anchoring element or bead wire 2$_I$, surmounted radially by a generally triangular profiled element which is extended radially by a sidewall not having any additional reinforcement. The asymmetrical tire of FIG. 3 therefore comprises a carcass reinforcement formed of two plies 1B and 1A of radial textile cables, the axially inner ply 1B being wound within each bead around an anchoring bead wire 2 to form upturns 1'B$_E$ and 1'B$_I$, and the axially outer carcass ply 1A being within each bead axially adjacent to the upturns 1'B$_E$ or 1'B$_I$ of the ply 1B.

If, in the preceding example, the meridian profiles of the carcass ply 1B anchored to the bead wires 2$_E$ and 2$_I$ have, at the points of tangency $T_E$ and $T_I$ of said meridian profiles with the bead wires 2$_E$ and 2$_I$, tangent lines $T_E T'_E$ and $T_I T'_I$. These tangent lines form, relative to the axis of rotation, the angles, $\phi_{2E}$ and $\phi_{2I}$. which are substantially equal. It is advantageous to improve the road handling of certain vehicles to have different meridian profiles of the carcass reinforcement on either side of the equatorial plane. The tire shown in FIG. 4 comprises a carcass reinforcement composed of two plies 1A and 1B. The axially outer carcass ply 1A, on the first side of the equatorial plane (on the left in FIG. 4), is anchored to the bead wire $2_E$ by winding to form an upturn $1'A_E$ such as described in the examples shown in FIGS. 1 and 2. That is to say, an upturn forming the sides of a profiled element or wedge $3_E$ of rubber mix of high hardness. On the second side of the equatorial plane (on the right in FIG. 4), it is not anchored to the bead wire $2_I$ by winding but has an edge axially adjacent to the upturn $1'B_I$ of the axially inner ply 1B. This ply 1B forms, on the second side of the equatorial plane, a single upturn $1'B_I$ rising radially into the bead, and has on the first side of this plane an edge placed adjacent to the upturn $1'A_E$ of the axially outer ply 1A.

The two beads $B_E$ and $B_I$ are of the type having seats inclined towards the outside and intended to be mounted on a rim having on either side of the equatorial plane rim seats having axially inner ends which are on circles of diameters greater than the diameters of the circles on which their axially outer ends are located, said seats being extended axially to the outside by protrusions (or humps) of low heights.

Figure 4:
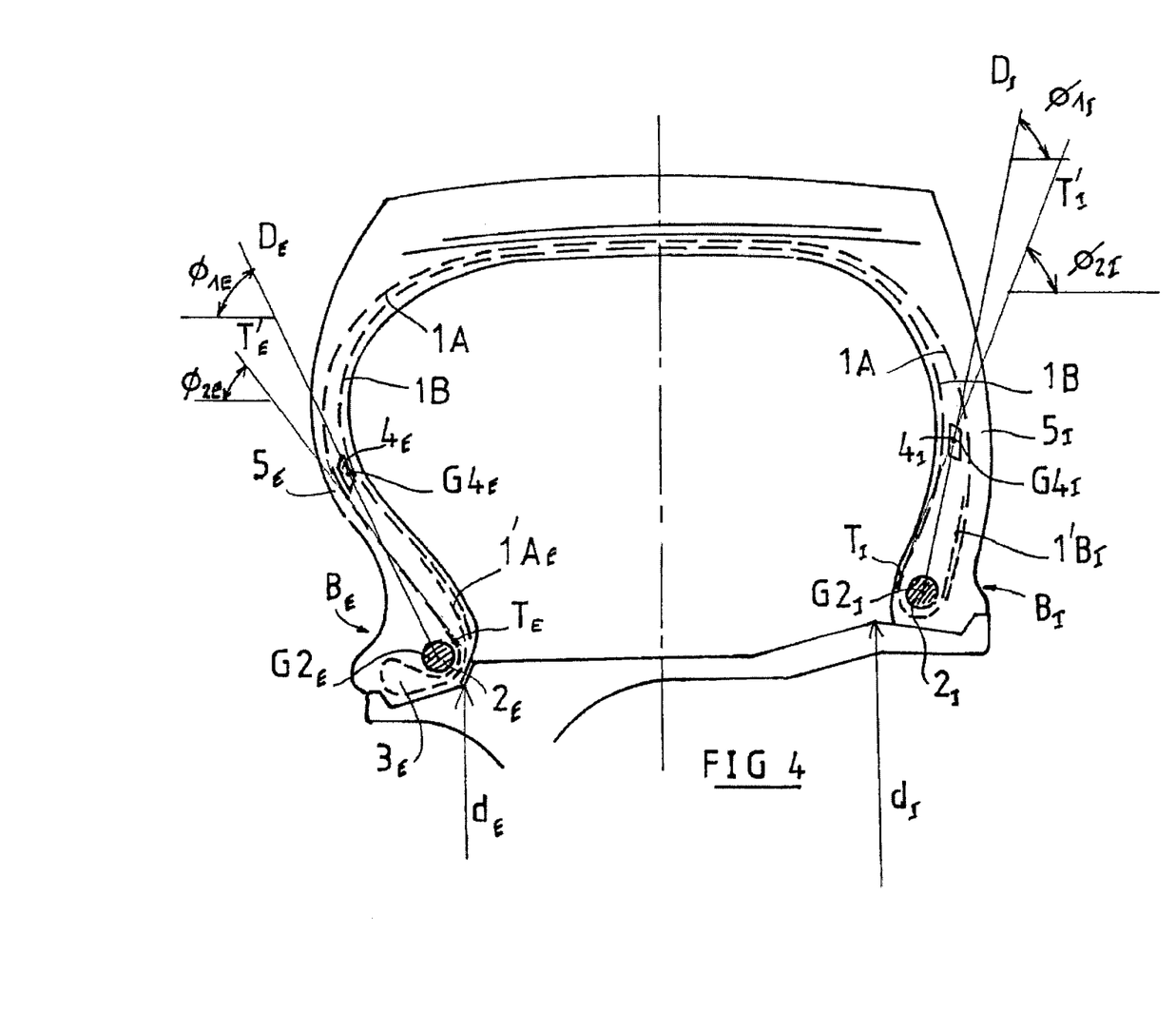
FIG. 4 shows a second asymmetrical tire variant.

The two sidewalls $5_E$ and $5_I$, in addition to the two carcass plies, are reinforced by two additional rings $4_E$ and $4_I$ axially to the inside of the ply 1A. In meridian sections, the centers of gravity of the two rings are substantially at equal distance from the axis of rotation of the tire. On the first side of the equatorial plane, the straight line $D_E$, joining the centers of gravity $G_{2E}$ and $G_{4E}$, of the bead wire $2_E$ and the ring $4_E$ respectively, forms relative to the axis of rotation an angle $\phi_{1E}$ of 55°, whereas the tangent $T_E T'_E$ to the meridian profile of the ply 1A at the point of tangency $T_E$ with the bead wire $2_E$ forms relative to the axis of rotation an angle $\phi_{2E}$ equal to 42°. On the second side of the equatorial plane, the sidewall $5_I$ of the tire is said to be more taut, in the sense that the tangent $T_I T'_I$ to the meridian profile of the ply 1B at the point of tangency $T_I$ with the bead wire $2_I$ forms relative to the axis of rotation an angle $\phi_{2I}$ equal to 75° and greater than the angle $\phi_{2E}$. Also in the sidewall $5_I$, the straight line $D_I$ joining the centers of gravity $G_{2I}$ and $G_{4I}$ of the meridian sections of the bead wire $2_I$ and of the ring $4_I$, respectively forms relative to the axis of rotation an angle $\phi_{1I}$ equal to 85°. Therefore, $\phi_{1I}$ is significantly greater than the angle $\phi_{1E}$.

FIGS. 3 and 4 show another asymmetry, which is very advantageous for facilitating the mounting of the tires on their operating rims and their dismounting. This asymmetry consists of having tires with beads having different diameters. By definition, the diameter of a bead is the distance between the two points of intersection, diametrically opposed and farthest from the axis of rotation, of the generatrices of rim seats with the generatrices of the walls axially adjacent to said seats. In the case of a seat said to be inclined towards the outside, the diameter $d_E$ (FIG. 1) is measured at the intersection of the generatrix 12B of the seat with the axially inner generatrix 12C. In the case of a conventional bead, said diameter $d_I$ is measured at the intersection of the generatrix of the seat with the generatrix of the vertical bead wall (FIG. 3, right-hand side). The relative difference in diameter $(d_I-d_E)/d_E$ may be between 3% and 10%.

The invention claimed is:

1. A tire comprising at least a first and a second bead radially extending to at least a first and a second sidewall, respectively, and said sidewalls joined to a tread; said first bead having a seat the generatrix of which has its axially inner end on a circle of diameter greater than the diameter of the circle on which is located the axially outer end, and a carcass reinforcement formed of at least one carcass ply and anchored in said first bead to at least one annular bead anchoring element, and when said tire is mounted on its operating rim and inflated to its recommended pressure, the meridian profile of said carcass reinforcement has a tangent to the point of tangency of said meridian profile with said anchoring element of said first bead that forms relative to the axis of rotation an angle open towards the outside of less than 70°, and characterized in that said first sidewall further comprises:
an inextensible additional sidewall ring located axially to the inside of an axially outermost carcass ply, and
a lower sidewall profiled rubber mix element extending radially between and connecting said annular bead anchoring element with said additional sidewall ring, and located axially to the inside of said axially outermost carcass ply.

2. The tire according to claim 1, wherein said additional sidewall ring is located radially at a distance $H_2$, measured from the base of said bead, at most equal to two-thirds of a height H of the tire mounted on the rim.

3. The tire according to claim 1, wherein a straight line D joining the two centers of gravity $G_2$ and $G_4$ of the meridian sections of said anchoring bead wire and of said sidewall ring, respectively forms an angle $\phi_1$ open towards the outside of at most 70° with the axial direction.

4. The tire according to claim 1, wherein said lower sidewall profiled rubber element comprises at least one compound having a Shore A hardness at least equal to 65 points.

5. The tire according to claim 4, wherein said carcass reinforcement ply is anchored in said bead by winding around a bead wire of quasi-circular section to form an upturn extending into a wedge-shaped profiled rubber element having a Shore A hardness greater than 65 points, and wherein the cross-section of said wedge-shaped profiled rubber element corresponds to a sector of a circle with an apex A radially beneath said anchoring bead wire, a radially upper side and a radially lower side extending from said apex and joined to a third side opposite said apex A, said radially upper side forming relative to the axis of rotation an angle of between 20° and 70° and said radially lower side forming with the same axis an angle of between 0° and 30°.

6. The tire according to claim 5, wherein said upturn of said carcass reinforcement ply has a length at least equal to the total perimeter of said wedge-shaped element, and whereby said ply forms said radially outer and inner sides of the wedge-shaped element and said side opposite said apex A and the end of said ply being located axially beyond said apex A of said outer and inner sides.

7. The tire according to claim 6, wherein said upturn of said carcass ply forms firstly said radially outer side of said wedge, then said side opposite said apex A, then finally said radially inner side of said wedge.

8. The tire according to claim 6, wherein said upturn of said carcass ply forms firstly said radially inner side of said wedge, then said side opposite said apex A, then finally said radially outer side of said wedge.

9. The tire according to claim 1, wherein said carcass reinforcement comprises at least two carcass plies, the second ply, referred to as an axially innermost carcass ply, is located axially to the inside of said additional sidewall ring and axially to the inside of said lower sidewall profiled element which is radially connected between said bead anchoring element and said additional sidewall ring.

10. The tire according to claim 1, wherein said first bead $B_E$ and respective first sidewall and said second bead $B_I$ and respective second sidewall are symmetrical relative to the equatorial plane XX' of said tire.

11. The tire according to claim 1, wherein said first bead $B_E$ and respective first sidewall and said second bead $B_I$ and respective second sidewall are dissymmetrical relative to the equatorial plane XX' of said tire.

12. The tire according to claim 11, wherein the second bead $B_I$ has a seat the generatrix of which has its axially inner end on a circle of diameter less than the diameter of the circle on which is located its axially outer end, said second bead being intended to be mounted on a conventional rim seat extended axially to the outside by a rim flange.

13. The tire according to claim 1, wherein said carcass reinforcement comprises at least one carcass ply having radial reinforcement elements.

14. A tire comprising at least a first and a second bead radially extending to at least a first and a second sidewall, respectively, and said sidewalls joined to a tread; said first bead having a seat the generatrix of which has its axially inner end on a circle of diameter greater than the diameter of the circle on which is located the axially outer end, and a carcass reinforcement formed of at least one carcass ply and anchored in said first bead to at least one annular bead anchoring element, and when said tire is mounted on its operating rim and inflated to its recommended pressure, the meridian profile of said carcass reinforcement has a tangent to the point of tangency of said meridian profile with said anchoring element of said first bead that forms relative to the axis of rotation an angle open towards the outside of less than 70°, wherein said first bead $B_E$ and respective first sidewall and said second bead $B_I$ and respective second sidewall are dissymmetrical with respect to the equatorial plane XX' of the tire, wherein said first and second beads have respectively different diameters $d_E$ and $d_I$ respectively and wherein the sidewall radially extending the first bead comprises:
an inextensible additional sidewall ring located axially to the inside of an axially outermost carcass ply, and
a lower sidewall profiled rubber mix element extending radially between and connecting said annular bead anchoring element with said additional sidewall ring, and located axially to the inside of said axially outermost carcass ply.

15. A tire comprising at least a first and a second bead radially extending to at least a first and a second sidewall, respectively, and said sidewalls joined to a tread; said first bead having a seat the generatrix of which has its axially inner end on a circle of diameter greater than the diameter of the circle on which is located the axially outer end, and a carcass reinforcement formed of at least two carcass plies anchored in said first bead to at least one annular bead anchoring element, and when said tire is mounted on its operating rim and inflated to its recommended pressure, the meridian profile of said carcass reinforcement has a tangent to the point of tangency of said meridian profile with said anchoring element of said first bead that forms relative to the axis of rotation an angle open towards the outside of less than 70°, and characterized in that said first sidewall further comprises:
an inextensible additional sidewall ring located axially to the inside of an axially outermost carcass ply, and
a lower sidewall profiled rubber mix element extending radially between and connecting said annular bead anchoring element with said additional sidewall ring, and located axially to the inside of said axially outermost carcass ply;
an axially innermost carcass ply located axially to the inside of said additional sidewall ring and axially to the inside of said lower sidewall profiled rubber mix element; and
a crescent-shaped profiled rubber element posed axially to the inside of said axially innermost carcass ply and having a maximum axial thickness at the level of the line of maximum axial width of said tire and further having a minimum axial thicknesses at the levels of the edges of a crown reinforcement in said tread and the carcass anchoring element, respectively.

16. A tire comprising at least a first and a second bead radially extending to at least a first and a second sidewall, respectively, and said sidewalls joined to a tread; said first bead having a seat the generatrix of which has its axially inner end on a circle of diameter greater than the diameter of the circle on which is located the axially outer end, and a carcass reinforcement formed of at least one carcass ply and anchored in said first bead to at least one annular bead anchoring element, and when said tire is mounted on its operating rim and inflated to its recommended pressure, the meridian profile of said carcass reinforcement has a tangent to the point of tangency of said meridian profile with said anchoring element of said first bead that forms relative to the axis of rotation an angle open towards the outside of less than 70°, wherein said first sidewall further comprises:
an inextensible additional sidewall ring located axially to the inside of an axially outermost carcass ply, and
a lower sidewall profiled rubber mix element extending radially between and connecting said annular bead anchoring element with said additional sidewall ring, and located axially to the inside of said axially outermost carcass ply,
wherein said first bead $B_E$ and respective first sidewall and said second bead $B_I$ and respective second sidewall are dissymmetrical with respect to the equatorial plane XX' of the tire such that said second bead $B_I$ has a seat the generatrix of which has its axially inner end on a circle of diameter greater than the diameter of the circle on which is located its axially outer end, and a carcass reinforcement in said second sidewall formed of the at least one carcass ply and anchored in said second bead to one of said at least one annular bead anchoring element, and when said tire is mounted on its operating rim and inflated to its recommended pressure, the meridian profile of said carcass reinforcement has a constant direction of curvature and has a tangent $T_I T'_I$ to the point of tangency $T_I$ of said meridian profile with said anchoring element of said second bead that forms relative to the axis of rotation an angle $\phi_{2I}$ open towards the outside and at least equal to 20°.

17. The tire according to claim 16, wherein said angle $\phi_{2I}$ is greater than an angle $\phi_{2E}$, formed relative to the axis of rotation by a tangent $T_E T'_E$ to the point of tangency $T_E$ to said meridian profile with said bead anchoring element of said first bead $B_E$, and said angle $\phi_{2I}$ is at most equal to 90°.

18. The tire according to claim 17, wherein said second sidewall further comprises an inextensible additional sidewall ring located axially to the inside of an axially outermost carcass ply of said carcass reinforcement in said second sidewall, a lower sidewall profiled rubber element located radially between and connecting an annular anchoring element of said second bead $B_I$ with said additional sidewall ring of said second sidewall.

19. A tire comprising at least a first and a second bead radially extending to at least a first and a second sidewall, respectively, and said sidewalls joined to a tread; said first bead having a seat the generatrix of which has its axially inner end on a circle of diameter greater than the diameter of the circle on which is located the axially outer end, and a carcass reinforcement formed of at least one carcass ply and anchored in said first bead to at least one annular bead anchoring element, and when said tire is mounted on its operating rim and inflated to its recommended pressure, the meridian profile of said carcass reinforcement has a tangent to the point of tangency of said meridian profile with said anchoring element of said first bead that forms relative to the axis of rotation an angle open towards the outside of less than 70°, and characterized in that said first sidewall further comprises:

an inextensible additional sidewall ring located axially to the inside of an axially outermost carcass ply, and     a lower sidewall profiled rubber mix element extending radially between and connecting said annular bead anchoring element with said additional sidewall ring, and located axially to the inside of said axially outermost carcass ply.

wherein said first bead $B_E$ and respective first sidewall and said second bead $B_I$ and respective second sidewall are dissymmetrical with respect to the equatorial plane XX' of the tire, wherein the second bead $B_I$ has a seat the generatrix of which has its axially inner end on a circle of diameter less than the diameter of the circle on which is located its axially outer end, said second bead being intended to be mounted oh a conventional rim seat extended axially to the outside by a rim flange, and wherein, when said tire is mounted on the operating rim and inflated to the recommended pressure, the meridian profile of a carcass reinforcement in said second sidewall has a constant direction of curvature and has a tangent $T_I T'_I$ to the point of tangency $T_I$ of said profile with an annular anchoring element of said second bead $B_I$ that forms, relative to the axis of rotation, an angle $\phi_{2I}$ open towards the outside, and said angle $\phi_{2I}$ is greater than an angle $\phi_{2E}$ formed, relative to the axis of rotation, by a tangent $T_E T'_E$ to said meridian profile in said first sidewall at the point of tangency $T_E$ of said meridian profile with said anchoring element of the first bead $B_E$.

20. The tire according to claim 19 wherein said second sidewall further comprises an inextensible additional sidewall ring and said angle $\phi_{2I}$ is at most equal to 90°.

* * * * *